US012756443B2

(12) United States Patent
Li et al.

(10) Patent No.: US 12,756,443 B2
(45) Date of Patent: Oct. 6, 2026

(54) INFORMATION TRANSMISSION METHOD, DEVICE, AND STORAGE MEDIUM

(71) Applicant: ZTE CORPORATION, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 289 days.

(21) Appl. No.: 18/694,165

(22) PCT Filed: Oct. 28, 2022

(86) PCT No.: PCT/CN2022/128287

§ 371 (c)(1),
(2) Date: Mar. 21, 2024

(87) PCT Pub. No.: WO2023/078176

PCT Pub. Date: May 11, 2023

(65) Prior Publication Data

US 2024/0291541 A1 Aug. 29, 2024

(30) Foreign Application Priority Data

Nov. 4, 2021 (CN) ......................... 202111301957.6

(51) Int. Cl.
*H04B 7/06* (2006.01)

(52) U.S. Cl.
CPC ......... *H04B 7/0626* (2013.01); *H04B 7/0632* (2013.01); *H04B 7/0634* (2013.01); *H04B 7/0639* (2013.01)

(58) Field of Classification Search
CPC .. H04B 7/0626; H04B 7/0632; H04B 7/0634; H04B 7/0639; H04B 7/048; H04L 5/0057; H04W 24/10
See application file for complete search history.

(56) References Cited

U.S. PATENT DOCUMENTS 9,859,962 B2 * 1/2018 Wang .................. H04B 7/0456
10,868,603 B2 * 12/2020 Rahman .............. H04B 7/0469
(Continued)

FOREIGN PATENT DOCUMENTS

CN 110535513 A 12/2019
CN 113039728 A 6/2021
(Continued)

OTHER PUBLICATIONS

Second Office Action in Japanese Application No. 2024-526662 dated Oct. 2, 2025, 8 pages including translation.
(Continued)

*Primary Examiner* — J. Brant Murphy
(74) *Attorney, Agent, or Firm* — Morgan, Lewis & Bockius LLP

(57) ABSTRACT

Provided are an information transmission method, a device and a storage medium. The information transmission method applied to a first communication node includes: receiving configuration information of a second communication node and reporting channel state information to the second communication node according to the configuration information. The channel state information includes a precoding matrix indicator, and the precoding matrix indicator includes a strongest coefficient indicator. A precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors. The
(Continued)

strongest coefficient indicator is used to indicate index of a strongest coefficient in the first coefficients.

18 Claims, 2 Drawing Sheets

(56) References Cited

U.S. PATENT DOCUMENTS

| | | | | |
|---|---|---|---|---|
| 2016/0043789 | A1* | 2/2016 | Wang | H04B 7/0456 370/329 |
| 2019/0280750 | A1* | 9/2019 | Rahman | H04L 25/03923 |
| 2020/0028554 | A1* | 1/2020 | Zhang | H04B 7/0478 |
| 2020/0162142 | A1* | 5/2020 | Rahman | H04B 7/0478 |
| 2020/0244329 | A1* | 7/2020 | Xiao | H04B 7/0481 |
| 2020/0295812 | A1* | 9/2020 | Rahman | H04B 7/0695 |
| 2021/0075487 | A1* | 3/2021 | Rahman | H04B 7/0626 |
| 2021/0175950 | A1* | 6/2021 | Sergeev | H04B 7/0634 |
| 2021/0258058 | A1* | 8/2021 | Wu | H04B 7/0417 |
| 2022/0052732 | A1* | 2/2022 | Sun | H04B 7/0639 |

FOREIGN PATENT DOCUMENTS

| | | | |
|---|---|---|---|
| CN | 113491074 | A | 10/2021 |
| EP | 3855635 | A1 | 7/2021 |
| JP | 2013-085233 | A | 5/2013 |

OTHER PUBLICATIONS

Extended European Search Report in Application No. 22889201.4 dated Jul. 17, 2025, 10 pages.

Nokia et al., "Enhancement on CSI measurement and reporting", 3GPP TSG RAN WG1 Meeting #10 6-e, R1-2108058, e-Meeting, Aug. 16-27, 2021.

International Search Report in Application No. PCT/CN2022/128287, dated Dec. 13, 2022, 4 pages, including translation.

First Office Action in Japanese Application No. 2024-526662, dated May 1, 2025, 17 pages (including translation).

* cited by examiner

INFORMATION TRANSMISSION METHOD, DEVICE, AND STORAGE MEDIUM

CROSS REFERENCE TO RELATED APPLICATIONS

This is a National Stage Application, filed under 35 U.S.C. 371, of International Patent Application No. PCT/CN2022/128287, filed on Oct. 28, 2022, which is based on and claims priority to Chinese Patent Application No. 202111301957.6 filed with the China National Intellectual Property Administration (CNIPA) on Nov. 4, 2021, the disclosure of which is incorporated herein by reference in its entirety.

TECHNICAL FIELD

The present application relates to the communication field and, in particular, to an information transmission method, a device and a storage medium.

BACKGROUND

In a wireless communication system, a base station may determine a data transmission strategy according to a channel state represented by received channel state information and transmit data according to the data transmission strategy to improve the data transmission efficiency. Thus, how to design a processing mechanism of the channel state information to improve the accuracy of the obtained channel state and reduce the used resource overhead and the system complexity remains an urgent problem to be solved.

SUMMARY

Embodiments of the present application provide an information transmission method. The method is applied to a first communication node and includes the following.

Configuration information of a second communication node is received.

Channel state information is reported to the second communication node according to the configuration information.

The channel state information includes a precoding matrix indicator, and the precoding matrix indicator includes a strongest coefficient indicator.

A precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors. The strongest coefficient indicator is used to indicate index of a strongest coefficient in the first coefficients.

Embodiments of the present application provide an information transmission method. The method is applied to a second communication node and includes the following.

Configuration information is determined.

The configuration information is sent to a first communication node to enable the first communication node to report channel state information according to the configuration information.

The channel state information includes a precoding matrix indicator, and the precoding matrix indicator includes a strongest coefficient indicator. A precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors. The strongest coefficient indicator is used to indicate index of a strongest coefficient in the first coefficients.

Embodiments of the present application provide a communication device. The communication device includes a communication module, a memory and one or more processors.

The communication module is configured to perform communication interaction between a first communication node and a second communication node.

The memory is configured to store one or more programs.

When executed by the one or more processors, the one or more programs cause the one or more processors to perform the method according to any one of the preceding embodiments.

Embodiments of the present application provide a storage medium storing a computer program which, when executed by a processor, causes the processor to perform the method according to any one of the preceding embodiments.

DETAILED DESCRIPTION

Figure 1:
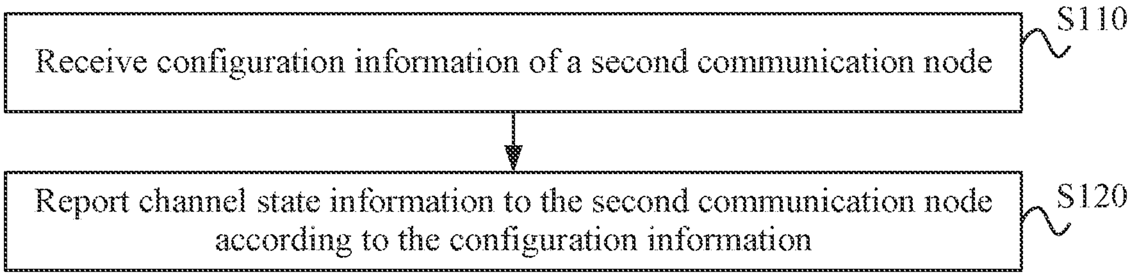
FIG. 1 is a flowchart of an information transmission method according to an embodiment of the present application.

Embodiments of the present application are described hereinafter in conjunction with drawings. The present application is described hereinafter in conjunction with the embodiments and the drawings. The examples listed hereinafter are merely intended to explain the present application and not to limit the scope of the present application.

Wireless communications have developed to the 5th communication technology. Long-term evolution (LTE) in the 4th wireless communication technology and New Radio (NR) in the 5th wireless communication technology are based on orthogonal frequency-division multiplexing (OFDM). In OFDM, the minimum frequency domain unit is a subcarrier, and the minimum time domain unit is an OFDM symbol. To facilitate the use of frequency domain resources, a resource block (RB) is defined, and one resource block is defined as a certain number of successive subcarriers. A bandwidth part (BWP) is also defined, and one bandwidth part is defined as another certain number of successive resource blocks on one carrier. To facilitate the use of time domain resources, a slot is defined, and one slot is defined as yet another certain number of successive OFDM symbols.

A method for acquiring channel state information in a wireless communication system and a method for transmitting data using the channel state information include the following steps. A base station sends a reference signal. A terminal measures the reference signal, determines channel state information from the base station to the terminal and reports the channel state information to the base station. The base station receives the channel state information reported by the terminal. The base station determines a data transmission strategy according to a channel state represented by the received channel state information and transmits data so as to improve the data transmission efficiency. The accuracy of the channel state represented by the channel state information affects the transmission strategy of the base station so as to affect the data transmission efficiency. Moreover, the base station needs to occupy the overhead of downlink resources for sending the reference signal, and the terminal needs to occupy the overhead of uplink resources for uploading the channel state information. On the other hand, increased system complexity increases the cost of the system and the energy loss. Therefore, multiple factors need to be comprehensively considered in design.

The development of wireless communication technology needs to further design a processing mechanism of the channel state information to improve the accuracy of the obtained channel state and reduce the used resource overhead and the system complexity.

The reference signal sent to the terminal by the base station is a downlink reference signal. Downlink reference signals for reporting the channel state information in an LTE system include a cell-specific reference signal (CRS) and a channel state information reference signal (CSI-RS). Downlink reference signals for reporting the channel state information in an NR system includes a CSI-RS. The CSI-RS is carried by a channel state information reference signal resource. The channel state information reference signal resource is formed by code-division multiplexing (CDM) groups. One CDM group is formed by wireless resource elements. A CSI-RS of a group of CSI-RS ports is multiplexed thereon by using code-division multiplexing.

The content of the channel state information transmitted between the base station and the terminal includes a channel quality indicator (CQI) for indicating the quality of a channel or a precoding matrix indicator (PMI) for indicating a precoding matrix applied to antennas of a base station. One type of CQI reporting format is wideband CQI reporting, that is, one channel quality is reported for a channel state information reporting band, and the channel quality corresponds to the entire channel state information reporting band. Another type of CQI reporting format is subband CQI reporting, that is, channel qualities are provided for the channel state information reporting band in unit of subbands, where one channel quality corresponds to one subband, that is, one channel quality is reported for each subband of the channel state information reporting band. The each subband is a frequency domain unit and is defined as N successive RBs, where N is a positive integer. For ease of description, the each subband is referred to as a channel quality indicator subband, or a CQI subband, or a subband in the present application. N is referred to as the size of the CQI subband, or the CQI subband size, or the subband size. The bandwidth part (BWP) is divided into subbands. The channel state information reporting band is defined by a subset of the subbands of the bandwidth part (BWP). The channel state information reporting band is a band on which channel state information needs to be reported.

A manner for determining a channel quality is determined according to the strength of the reference signal received by the terminal. Another manner for determining a channel quality is determined according to the signal-to-noise ratio of the received reference signal. On the channel state information reporting band, if the channel quality does not change significantly, reporting the CQI in the manner of the wideband CQI reporting can reduce the resource overhead for reporting the CQI; if the channel quality differs significantly in the frequency domain, reporting the CQI in the manner of the subband CQI reporting can increase the accuracy of reporting the CQI.

One type of PMI reporting format is wideband PMI reporting, that is, one PMI is reported for the channel state information reporting band, and the PMI corresponds to the entire channel state information reporting band. Another type of PMI reporting format is subband PMI reporting, that is, one PMI or one component of the PMI is reported for the each subband of the channel state information reporting band. For example, the PMI is composed of X1 and X2, and one manner for reporting one component of the PMI for the each subband of the channel state information reporting band includes: reporting one X1 for the entire band, and reporting one X2 for the each subband; and another manner includes: reporting one X1 and one X2 for the each subband.

Another type of PMI reporting format is that the reported PMI indicates R precoding matrices for the each subband, where R is a positive integer. From the perspective of feeding back the frequency domain granularity of a precoding matrix, R also denotes the number of precoding matrix subbands included in the each subband or the number of precoding matrix subbands included in each CQI subband.

A method for reporting channel state information includes that a terminal receives configuration information (including first configuration information and second configuration information) of a base station, the terminal receives a channel state information reference signal transmitted by the base station according to the configuration information, and the terminal reports channel state information according to the configuration information.

The channel state information includes a precoding matrix indicator. A precoding matrix is determined by a first group of vectors or by a first group of vectors and a second group of vectors. The first group of vectors include L vectors, and the second group of vectors include $M_v$ vectors, where L and $M_v$ are positive integers. One vector in the first group of vectors corresponds to one port of the channel state information reference signal. One vector in the second group of vectors is a discrete Fourier transform (DFT) vector whose index is $$n_3^{(f)}$$

An element of the DTF vector whose index is $$n_3^{(f)}$$

is:

$$e^{j\frac{2\pi t n_3^{(f)}}{N_3}}.\ t=\{0, 1, \ldots, N_3-1\},$$

and $N_3$ denotes the number of precoding matrices.

t denotes an index of the element in the DFT vector and has values of 0, 1, . . . , $N_3-1$. t may also denote an index of the precoding matrix. t may also denote an index of a frequency domain unit. One value of t corresponds to one frequency domain unit. For example, a precoding matrix whose index is t and that corresponds to an element whose index is t of the DFT vector in the second group of vectors is a precoding matrix of a frequency domain unit whose index is t.

The precoding matrix may be composed of only the first group of vectors or may also be composed of the first group of vectors and the second group of vectors. The precoding matrix is composed of only the first group of vectors, where one layer is exemplified as: $W=W_1W_2$. W denotes the precoding matrix, $W_1$ denotes a matrix formed by the first group of vectors, and $W_2$ denotes a coefficient combining the first group of vectors to form the precoding matrix and is denoted by a matrix. The precoding is matrix composed of the first group of vectors and the second group of vectors, where one layer is exemplified as: $W=W_1W_2W_f$. W denotes the precoding, $W_1$ denotes a matrix formed by the first group of vectors, $W_f$ denotes a matrix formed by the second group of vectors, and $W_2$ denotes a coefficient combining the first group of vectors and the second group of vectors to form the precoding matrix and is denoted by a matrix.

In order for the terminal to report the CSI, the base station configures CSI-RS resources to the terminal, where the number of ports of the CSI-RS resources is P. The terminal selects $K_1$ ports from the P CSI-RS ports, where L ports are selected in each polarization direction, and $K_1=2L$. Each port in the L ports is mapped to one vector in the first group of vectors. The number of coefficients reported by the terminal to form the one layer of the precoding matrix does not exceed $K_0$, and the total number of coefficients reported to form all the layers of the precoding matrix does not exceed $2K_0$, where $K_0=\lceil 2LM_v\beta \rceil$, and β denotes a parameter configured by the base station to the terminal. The terminal reports the number $K^{NZ}$ of reported coefficients to the base station.

One port whose serial number is $m_i$ is mapped to one vector $v_{m_i}$ in such a manner that $v_{m_i}$ is a vector including P/2 elements, where the ($m_i$ mod P/2)-th element is 1, and the remaining elements are 0. mod denotes a module operation, $m_i$ denotes a dividend, P/2 denotes a divisor, and the first element is the 0-th element. An example in which P equals to 8, and $m_i$ equals to 2 is used, and $v_2=[0,0,1,0]^T$, where T denotes transposition.

An example in which the L vectors form $W_1$ is illustrated, and $$W_1 = \begin{bmatrix} v_{m_0} \ v_{m_1} \ \dots \ v_{m_{L-1}} & O \ O \ O \ O \\ O \ O \ O \ O & v_{m_0} \ v_{m_1} \ \dots \ v_{m_{L-1}} \end{bmatrix}.$$

O denotes a vector including P/2 elements with all elements being 0.

A vector in the second group of vectors is denoted as $y^{(f)}$ where f=0, 1, . . . , $M_v-1$. For example, $M_v$ vectors in the second group of vectors are $y^{(0)}$, $y^{(1)}$, . . . , $y^{(M_v-1)}$ and are row vectors. An example in which the $M_v$ vectors in the second group of vectors form $W_f$ is illustrated as:

$$W_f = \begin{bmatrix} y^{(0)} \\ y^{(1)} \\ \vdots \\ y^{(M_v-1)} \end{bmatrix}.$$

In the case where the precoding matrix is composed of only the first group of vectors, the one layer of the precoding matrix is exemplified as: $W=W_1W_2$. W denotes the precoding matrix, $W_1$ denotes the matrix formed by the first group of vectors, and the dimension is P×2L. That is, a first dimension is P, and a second dimension is 2L. $W_2$ denotes the coefficient combining the first group of vectors to form the precoding matrix and is denoted by the matrix, and the dimension is 2L×1. That is, a first dimension is 2L, a second dimension is 1, and the number of elements included in $W_2$ is 2L. That is, the number of coefficients forming the one layer of the precoding matrix is 2L.

In the case where the precoding matrix is composed of the first group of vectors and the second group of vectors, the one layer of the precoding matrix is exemplified as: $W=W_1W_2W_f$. W denotes the precoding matrix, $W_1$ denotes the matrix formed by the first group of vectors, and the dimension is P×2L. That is, the first dimension is P, and the second dimension is 2L. We denotes the matrix formed by the second group of vectors, and the dimension is $M_v \times N_3$. That is, a first dimension is $M_v$, and a second dimension is $N_3$. $W_2$ denotes the coefficient combining the first group of vectors and the second group of vectors to form the precoding matrix and is denoted by the matrix, and the dimension is $2L \times M_v$. That is, a first dimension is 2L, a second dimension is $M_v$, and the number of elements included in $W_2$ is $2LM_v$. That is, the number of coefficients forming the one layer of the precoding matrix is $2LM_v$.

To save the overhead for the terminal to report the precoding matrix indicator, the terminal only reports a part of the coefficients forming the precoding matrix. For example, the base station configures the parameter β to the terminal to determine the parameter $K_0$, and $K_0=\lceil 2LM_v\beta \rceil$, where β denotes a positive integer less than or equal to 1. For the coefficients forming the one layer of the precoding matrix, the number of coefficients reported to the base station by the terminal does not exceed $K_0$. For the coefficients forming all the layers of the precoding matrix, the total number of coefficients reported to the base station by the terminal does not exceed $2K_0$. In order to enable the base station to receive the reported coefficients, the terminal also reports the number $K^{NZ}$ of the reported coefficients and a bitmap to the base station so as to indicate which coefficients in the coefficients forming the precoding matrix are reported by using non-zero bits of the bitmap. $K^{NZ}$ denotes the number K of coefficients whose values are not 0 and that are reported by the terminal to the base station.

In an embodiment, FIG. 1 is a flowchart of an information transmission method according to an embodiment of the present application. This embodiment may be performed by a first communication node. The first communication node may be a terminal side (such as a user equipment). As shown in FIG. 1, this embodiment includes the steps S110 to S120.

In S110, configuration information of a second communication node is received.

In S120, channel state information is reported to the second communication node according to the configuration information.

The channel state information includes a precoding matrix indicator, and the precoding matrix indicator includes a strongest coefficient indicator.

A precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors. The strongest coefficient indicator is used to indicate index of a strongest coefficient in the first coefficients.

In the embodiment, the strongest coefficient indicator refers to an indicator of the strongest coefficient in the first coefficients. The first coefficients refer to coefficients combining the first group of vectors to form the precoding matrix or combining the first group of vectors and the second group of vectors to form the precoding matrix. The strongest coefficient refers to a coefficient having the maximum amplitude in the first coefficients. Exemplarily, the maximum value of the amplitude is 1, so the strongest coefficient is a coefficient whose amplitude is 1 in the first coefficients. Certainly, in the case where a coefficient whose amplitude is 1 is not present in the first coefficients, a coefficient having the maximum amplitude in the first coefficients is searched and used as the strongest coefficient. In the embodiment, the strongest coefficient indicator is used to indicate the index of the strongest coefficient in the first coefficients. In the embodiment, the strongest coefficient indicator indicates the index of the strongest coefficient in the first coefficients so that coefficients of the index can be directly reported to the second communication node, and the first communication node does not need to report all the coefficients to the second communication node to enable the second communication node to analyze and determine the strongest coefficient so that the resource overhead for reporting the coefficients can be saved. Alternatively, the strongest coefficient indicator indicates the index of the strongest coefficient in the first coefficients, and the strongest coefficient uses a predefined value to save the direct reporting of an amplitude value and a phase value of the strongest coefficient so that the resource overhead for reporting the amplitude value and the phase value of the strongest coefficient can be saved. Since the strongest coefficient uses the predefined value, the accuracy of the used value of the strongest coefficient can be improved so that the accuracy of the reported precoding matrix can be improved, thereby improving the performance of the reported precoding matrix. For example, in a normalized scenario, the strongest coefficient is predefined as 1, that is, the amplitude value of the strongest coefficient is predefined as 1, and the phase value of the strongest coefficient is predefined as 0. The strongest coefficient indicator indicates the index of the strongest coefficient, without directly reporting the amplitude value and the phase value of the strongest coefficient. The index of the strongest coefficient may determine that a corresponding coefficient is the strongest coefficient with its amplitude value being one and its phase value being 0.

In an embodiment, the index of the strongest coefficient include an index of a first dimension and an index of a second dimension.

The index of the first dimension corresponds to the first group of vectors, and the index of the second dimension corresponds to the second group of vectors. It is to be understood that the precoding matrix is a matrix composed of two dimensions. Accordingly, the first coefficients for forming the precoding matrix also include two dimensions, that is, a first dimension and a second dimension. Accordingly, index of each first coefficient are composed of two dimensions, that is, the index of the strongest coefficient also include two dimensions, that is, the index of the first dimension and the index of the second dimension. The index of the first dimension corresponds to the first group of vectors, and the index of the second dimension corresponds to the second group of vectors. The one vector in the first group of vectors corresponds to the one port of the channel state information reference signal, and one element in one vector in the second group of vectors corresponds to one precoding matrix.

In an embodiment, a mapping relationship between the strongest coefficient indicator and the index of the first dimension and the index of the second dimension is determined according to the number of vectors in the second group of vectors. In the embodiment, the number of vectors in the second group of vectors refers to the total number of vectors in the second group of vectors.

In an embodiment, an adjustment value of the strongest coefficient indicator is a product of an adjustment value of the index of the first dimension and the number of vectors in the second group of vectors. In the embodiment, each time the index of the first dimension is changed by 1, the strongest coefficient indicator is correspondingly changed by the value of the number of vectors in the second group of vectors. Accordingly, each time the index of the first dimension is changed by n, the value of the strongest coefficient indicator is correspondingly changed by n times the value of the number of vectors in the second group of vectors.

In an embodiment, an adjustment value of the strongest coefficient indicator is a product of an adjustment value of the index of the second dimension and twice the number of vectors in the first group of vectors. In the embodiment, the number of vectors in the first group of vectors refers to the total number of vectors in the first group of vectors. In the embodiment, each time the index of the second dimension is changed by 1, the strongest coefficient indicator is correspondingly changed by twice the value of the number of vectors in the first group of vectors. Accordingly, each time the index of the second dimension is changed by n, the value of the strongest coefficient indicator is correspondingly changed by 2n times the value of the number of vectors in the first group of vectors.

In an embodiment, in response to the number of vectors in the second group of vectors being one, the mapping relationship between the strongest coefficient indicator and the index of the first dimension and the index of the second dimension is that the strongest coefficient indicator is the same as the index of the first dimension, and the index of the second dimension is 0. In the embodiment, in the case where the number of vectors in the second group of vectors is 1, the strongest coefficient indicator is the same as the index of the first dimension, and the index of the second dimension is 0.

In an embodiment, in response to the number of vectors in the second group of vectors being 2, the mapping relationship between the strongest coefficient indicator and the index of the first dimension and the index of the second dimension is that the strongest coefficient indicator is determined according to the index of the second dimension and a product of the index of the first dimension and the number of vectors in the second group of vectors. In the case where the number of vectors in the second group of vectors is 2, the value of the strongest coefficient indicator equals the sum of the value of the index of the second dimension and the product of the index of the first dimension and the number of vectors of the second group of vectors.

In an embodiment, the value range of the index of the first dimension is between 0 and twice the number of vectors in the first group of vectors minus 1, and the values of the index of the second dimension include 0 and 1.

In an embodiment, in response to the number of vectors in the second group of vectors being 2, the mapping relationship between the strongest coefficient indicator and the index of the first dimension and the index of the second dimension is that the strongest coefficient indicator is determined according to the index of the first dimension and a product of the index of the second dimension and the number of vectors in the first group of vectors.

In an embodiment, the strongest coefficient indicator and the index of the second dimension have the same adjustment value. In the embodiment, each time the index of the second dimension is adjusted by 1, the value of the strongest coefficient indicator is correspondingly adjusted by 1. Certainly, each time the index of the second dimension is adjusted by n, the value of the strongest coefficient indicator is correspondingly adjusted by n. n is a positive integer greater than 0.

In an embodiment, an adjustment value of the strongest coefficient indicator is a product of an adjustment value of the index of the second dimension and the number of vectors in the first group of vectors. In the embodiment, each time the index of the second dimension is adjusted by 1, the value of the strongest coefficient indicator is correspondingly adjusted by the product of the value of the index of the second dimension and the number of vectors in the first group of vectors. Accordingly, each time the index of the second dimension is adjusted by n, the value of the strongest coefficient indicator is correspondingly adjusted by a product of the value of the index of the second dimension, the number of vectors in the first group of vectors and n. n is 0 or 1.

Figure 2:
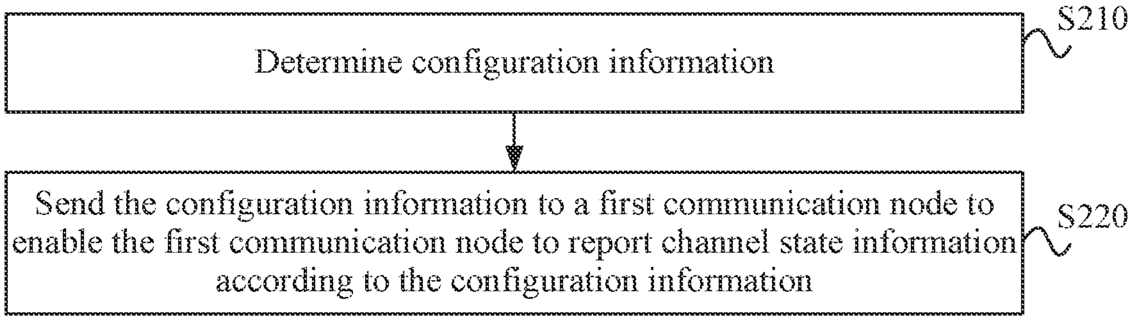
FIG. 2 is a flowchart of another information transmission method according to an embodiment of the present application.

In an embodiment, FIG. 2 is a flowchart of another information transmission method according to an embodiment of the present application. This embodiment may be performed by a second communication node. The second communication node may be a base station. As shown in FIG. 2, this embodiment includes the steps S210 to S220.

In S210, configuration information is determined.

In S220, the configuration information is sent to a first communication node to enable the first communication node to report channel state information according to the configuration information.

The channel state information includes precoding matrix indicators, and the precoding matrix indicators include a strongest coefficient indicator. A precoding matrix corresponding to each precoding matrix indicator is formed by combining first coefficients with a first group of vectors, or a precoding matrix corresponding to each precoding matrix indicator is formed by combining first coefficients with a group of vectors and a second group of vectors. The strongest coefficient indicator is used to indicate index of a strongest coefficient in the first coefficients.

In an embodiment, the index of the strongest coefficient include an index of a first dimension and an index of a second dimension.

The index of the first dimension corresponds to the first group of vectors, and the index of the second dimension corresponds to the second group of vectors.

In an embodiment, a mapping relationship between the strongest coefficient indicator and the index of the first dimension and the index of the second dimension is determined according to the number of vectors in the second group of vectors.

In an embodiment, an adjustment value of the strongest coefficient indicator is a product of an adjustment value of the index of the first dimension and the number of vectors in the second group of vectors.

In an embodiment, an adjustment value of the strongest coefficient indicator is a product of an adjustment value of the index of the second dimension and twice the number of vectors in the first group of vectors.

In an embodiment, in response to the number of vectors in the second group of vectors being one, the mapping relationship between the strongest coefficient indicator and the index of the first dimension and the index of the second dimension is that the strongest coefficient indicator is the same as the index of the first dimension, and the index of the second dimension is 0.

In an embodiment, in response to the number of vectors in the second group of vectors being 2, the mapping relationship between the strongest coefficient indicator and the index of the first dimension and the index of the second dimension is that the strongest coefficient indicator is determined according to the index of the second dimension and a product of the index of the first dimension and the number of vectors in the second group of vectors.

In an embodiment, the value range of the index of the first dimension is between 0 and twice the number of vectors in the first group of vectors minus 1, and the values of the index of the second dimension include 0 and 1.

In an embodiment, in response to the number of vectors in the second group of vectors being 2, the mapping relationship between the strongest coefficient indicator and the index of the first dimension and the index of the second dimension is that the strongest coefficient indicator is determined according to the index of the first dimension and a product of the index of the second dimension and the number of vectors in the first group of vectors.

In an embodiment, the strongest coefficient indicator and the index of the second dimension have the same adjustment value.

In an embodiment, an adjustment value of the strongest coefficient indicator is a product of an adjustment value of the index of the second dimension and the number of vectors in the first group of vectors.

It is to be noted that explanations of parameters in the information transmission method applied to the second communication node are referred to the descriptions in the information transmission method applied to the first communication node in the preceding embodiments, and details are not repeated herein.

In an embodiment, the reporting process of the channel state information is illustrated using an example in which the first communication node is a terminal, and the second communication node is a base station. In the embodiment, the steps for reporting the channel state information include that the terminal receives configuration information of the base station and reports channel state information according to the configuration information.

The channel state information includes the precoding matrix indicators. The precoding matrix corresponding to the each precoding matrix indicator is determined by the first group of vectors or by the first group of vectors and the second group of vectors. The first group of vectors include L vectors, and the second group of vectors include $M_v$ vectors, and L and $M_v$ are positive integers. The one vector in the first group of vectors corresponds to the one port of the channel state information reference signal, and one element in one vector in the second group of vectors corresponds to one precoding matrix.

For example, the configuration information includes the value of L or includes the value of L and the value of $M_v$. For another example, the configuration information includes version information of a codebook of the precoding matrix. For another example, the configuration information indicates a reference signal for measuring the channel state information when the channel state information is reported.

The precoding matrix indicators include first coefficient indicators. The first coefficient indicators are configured to indicate the first coefficients. The first coefficients are coefficients combining the first group of vectors to form the precoding matrix or combining the first group of vectors and the second group of vectors to form the precoding matrix.

Indexes of the first coefficients are used for identifying coefficients in the first coefficients. The indexes of the first coefficients include the index i of the first dimension and the index f of the second dimension. The index i of the first dimension corresponds to the first group of vectors, and the index f of the second dimension corresponds to the second group of vectors. For example, the first coefficient indicator $d_{i,f}$ having the index (i,f) of the first coefficient is mapped to a first coefficient $u_{i,f}$ having the index (i,f) in the first coefficients. The first coefficient indicator $d_{i,f}$ is an indicator whose index is (i,f) in the first coefficient indicators. The first coefficient $u_{i,f}$ is a coefficient whose index is (i,f) in the first coefficients. The index i of the first dimension corresponds to the first group of vectors, and the index f of the second dimension corresponds to the second group of vectors. That is, the index of the first coefficients are index of the coefficients in the first coefficients. The first coefficients include a first coefficient amplitude and a first coefficient phase. The first coefficient indicators also include a first coefficient amplitude indicator and a first coefficient phase indicator.

For example, an amplitude indicator $k_{i,f}$ of the first coefficient having the index (i,f) of the first coefficients is mapped to an amplitude $p_{i,f}$ of the first coefficient having the index (i,f) of the first coefficients. The amplitude indicator $d_{i,f}$ of the first coefficient is an indicator whose index is (i,f) in the amplitude indicators of the first coefficients. The amplitude $p_{i,f}$ of the first coefficient is an amplitude whose index is (i,f) in the amplitudes of the first coefficients. The index i of the first dimension corresponds to the first group of vectors, and the index f of the second dimension corresponds to the second group of vectors. For example, a phase indicator $c_{i,f}$ of the first coefficient having the index (i,f) of the first coefficients is mapped to a phase $\o_{i,f}$ of the first coefficient having the index (i,f) of the first coefficients. The phase indicator $c_{i,f}$ of the first coefficients is an indicator whose index is (i,f) in the phase indicators of the first coefficients. The phase $\o_{i,f}$ of the first coefficients is an phase whose index is (i,f) in the phases of the first coefficients. The index i of the first dimension corresponds to the first group of vectors, and the index f of the second dimension corresponds to the second group of vectors.

The strongest coefficient in the first coefficients is referred to as the strongest coefficient. The precoding matrix indicators include the strongest coefficient indicator. The strongest coefficient indicator is used to indicate the strongest coefficient. The strongest coefficient indicator is used to indicate the index of the strongest coefficient in the first coefficients, that is, to indicate the index of first coefficients of the strongest coefficient. For example, the strongest coefficient indicator s indicates the index (i', f') of the strongest coefficient in the first coefficients, where i' denotes the index of the first dimension, and f' denotes the index of the second dimension. An amplitude indicator $k_{i',f'}$ of the strongest coefficient is not reported, and an amplitude value $p_{i',f'}$ mapped by the amplitude indicator $k_{i',f'}$ of the strongest coefficient is 1. A phase indicator $c_{i',f'}$ of the strongest coefficient is not reported and is 0.

In an embodiment, the precoding indicators include the strongest coefficient indicators, and the strongest coefficient indicator s indicates the index (i', f') of the strongest coefficient in the first coefficients. The index i' of the first dimension corresponds to the first group of vectors, and the index f' of the second dimension corresponds to the second group of vectors. The first coefficients are the coefficients combining the first group of vectors to form the precoding matrix or combining the first group of vectors and the second group of vectors to form the precoding matrix.

In an embodiment, the strongest coefficient indicator s indicates the index (i', f') of the strongest coefficient in the first coefficients. The mapping relationship between the strongest coefficient indicator s and the index i' of the first dimension and the index f' of the second dimension is determined according to the value of $M_v$.

The strongest coefficient indicator s indicates the index (i', f') of the strongest coefficient in the first coefficients. This is indicated by the mapping relationship between the strongest coefficient indicator s and the index i' of the first dimension and the index f' of the second dimension. The mapping relationship between the strongest coefficient indicator s and the index i' of the first dimension and the index f' of the second dimension is determined according to the value of $M_v$.

As an example, the strongest coefficient indicator s indicates the index (i', f') of the strongest coefficient in the first coefficients, and each time the index i' of the first dimension is changed by 1, the value of the strongest coefficient indicators is changed by $M_v$.

For example, the mapping relationship between the strongest coefficient indicator s and the index i' of the first dimension and the index f' of the second dimension is: $s=i'\cdot M_v+f'$.

For another example, the mapping relationship between the strongest coefficient indicator s and the index i' of the first dimension and the index f' of the second dimension is: $s=i'\cdot M_v+f'$, where $i'\in\{0, 1, \ldots, 2L-1\}$, and $f'\in\{0, 1, \ldots, M_v-1\}$.

As another example, the strongest coefficient indicator s indicates the index (i', f') of the strongest coefficient in the first coefficients, and each time the index f' of the second dimension is changed by 1, the value of the strongest coefficient indicators is changed by 2L, where the value range of f' is an integer from 0 to $M_v-1$.

For example, the mapping relationship between the strongest coefficient indicator s and the index i' of the first dimension and the index f' of the second dimension is: $s=f'\cdot 2L+i'$, where $i'\in\{0, 1, \ldots, 2L-1\}$, and $f'\in\{0, 1, \ldots, M_v-1\}$.

Alternatively, the mapping relationship is: $s=2Lf'+i'$, where $i'\in\{0, 1, \ldots, 2L-1\}$, and $f'\in\{0, 1, \ldots, M_v-1\}$.

In an embodiment, in response to the value of $M_v$ being one, the mapping relationship between the strongest coefficient indicators and the index i' of the first dimension and the index f' of the second dimension is: $s=i'$, $f'=0$.

In response to the value of $M_v$ being two, the mapping relationship between the strongest coefficient indicator s and the index i' of the first dimension and the index f' of the second dimension is: $s=i'M_v+f'$.

Alternatively, the mapping relationship is: $s=i'M_v+f'$, where $i'\in\{0,1, \ldots, 2L-1\}$, and $f'=\{0, 1\}$.

Alternatively, the mapping relationship is:

$$s=\begin{cases} f'\cdot L+i';\ \text{wherein } i'=0, 1, \ldots, L-1;\ f'=0, 1; \\ f'\cdot L+i';\ \text{wherein } i'=L, L+1, \ldots, 2L-1;\ f'=0, 1; \end{cases}.$$

In the embodiment, in the case where the value ranges of i' are different, the mapping relationships between the strongest coefficient indicator s and the index i' of the first dimension and the index f' of the second dimension are also different.

In response to the value of $M_v$ being one, the mapping relationship between the strongest coefficient indicator s and the index i' of the first dimension and the index f' of the second dimension is: s=i', f'=0.

In response to the value of $M_v$ being two, the mapping relationship between the strongest coefficient indicator S and the index i' of the first dimension and the index f' of the second dimension is: $s=i'M_v+f'$.

Alternatively, the mapping relationship is $s=i'M_v+f'$, where $i'\in\{0,1, \ldots, 2L-1\}$, and $f'\in\{0, 1\}$.

Alternatively, the mapping relationship is:

$$s=\begin{cases} f'\cdot L+i'; \text{wherein } i'=0, 1, \ldots, L-1; f'=0, 1; \\ f'\cdot L+i'; \text{wherein } i'=L, L+1, \ldots, 2L-1; f'=0, 1; \end{cases}.$$

In an embodiment, the strongest coefficient indicator s indicates the index (i', f') of the strongest coefficient in the first coefficients. In the mapping relationship between the strongest coefficient indicator s and the index i' of the first dimension and the index f' of the second dimension, each time the index f' of the second dimension is changed by 1, the strongest coefficient indicator s is changed by 1.

For example, $s=i'.\ M_v+f'$.

For another example, $s=i'.\ M_v+f'$, where $i'\in\{0, 1, \ldots, 2L-1\}$, and $f'\in\{0, 1, \ldots, M_v-1\}$.

In an embodiment, the strongest coefficient indicator s indicates the index (i', f') of the strongest coefficient in the first coefficients, and each time the index f' of the second dimension is changed by 1, the value of the strongest coefficient indicator s is changed by L, where the value range of f' is an integer from 0 to $M_v-1$.

For example, $s=$ $$\begin{cases} f'\cdot L+i'; \text{wherein } i'=0, 1, \ldots, L-1; f'=0, 1; \\ f'\cdot L+i'; \text{wherein } i'=L, L+1, \ldots, 2L-1; f'=0, 1; \end{cases}.$$

In an embodiment, the channel state information further includes a first number indicator. The first number indicator is used to indicate the number K of coefficients that need to be reported in the first coefficients, and is reported by a field formed by A bits, and K is the value of the first number indicator plus 1. The value of the first number indicator is the value of the field formed by the A bits.

In another embodiment, the channel state information further includes a first number indicator. The first number indicator is used to indicate the number K of coefficients whose values are not 0 in the first coefficients, and is reported by a field formed by A bits, and K is the value of the first number indicator plus 1. The value of the first number indicator is the value of the field formed by the A bits.

It is to be noted that, to save the overhead for the terminal to report the precoding matrix indicators, the terminal only reports a part of the coefficients forming the precoding matrix. For example, the base station configures the parameter β to the terminal to determine the parameter $K_0$, and $K_0=\lceil 2LM_v\beta\rceil$, where β denotes a positive integer less than or equal to 1. For the coefficients forming the one layer of the precoding matrix, the number of coefficients reported to the base station by the terminal does not exceed $K_0$. For the coefficients forming all the layers of the precoding matrix, the total number of coefficients reported to the base station by the terminal does not exceed 2 Kg. In order to enable the base station to receive the reported coefficients, the terminal also reports the number $K^{NZ}$ of the reported coefficients and a bitmap to the base station so as to indicate which coefficients in the coefficients forming the precoding matrix are reported by using non-zero bits of the bitmap. $K^{NZ}$ denotes the number K of coefficients whose values are not 0 and that are reported by the terminal to the base station. In the case where the precoding matrix is only one layer, the maximum potential value B of the number of the coefficients that need to be reported in the first coefficients is $K_0$. In the case where the precoding matrix is multilayer, the maximum potential value B of the number of the coefficients that need to be reported in the first coefficients is $2K_0$. In the channel state information, the terminal uses the first number indicator to indicate the number of the coefficients that need to be reported in the first coefficients and uses the field formed by the A bits to report the first number indicator. K is the value of the first number indicator plus 1. The value of the first number indicator is the value of the field formed by the A bits. Alternatively, in the channel state information, the terminal uses the first number indicator to indicate the number K of the coefficients whose values are not 0 in the first coefficients and uses the field formed by the A bits to report the first number indicator. K is the value of the first number indicator plus 1. The value of the first number indicator is the value of the field formed by the A bits. A is a non-negative integer. For example, $A=\lceil\log_2(B)\rceil$, that is, A is a rounding value of a logarithm based on 2 of B. The first number indicator indicates K in such a manner that the 1-bit resource overhead can be saved. For example, the number B is 16, and B is the value of the field formed by the A bits, so A needs to be greater than 4, that is, A needs to be greater than 4 bits to report B; and if the number B is 16, and B is the value of the field formed by the A bits plus 1, so A only needs to equal 4, that is, only 4 bits are needed to report B. In this way, the 1-bit resource overhead for one reporting number B can be saved.

Figure 3:
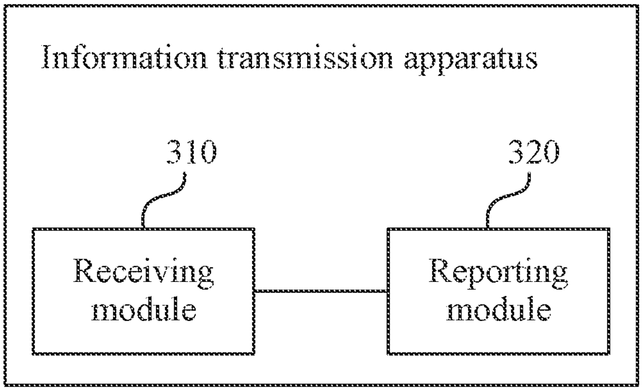
FIG. 3 is a block diagram illustrating the structure of an information transmission apparatus according to an embodiment of the present application.

In an embodiment, FIG. 3 is a block diagram illustrating the structure of an information transmission apparatus according to an embodiment of the present application. This embodiment is applied to a first communication node. As shown in FIG. 3, an information transmission apparatus in this embodiment includes a receiving module 310 and a reporting module 320.

The receiving module 310 is configured to receive configuration information of a second communication node.

The reporting module 320 is configured to report channel state information to the second communication node according to the configuration information.

The channel state information includes a precoding matrix indicator, and the precoding matrix indicator includes a strongest coefficient indicator.

A precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors. The strongest coefficient indicator is used to indicate index of a strongest coefficient in the first coefficients.

In an embodiment, the indexes of the strongest coefficient include an index of a first dimension and an index of a second dimension.

The index of the first dimension corresponds to the first group of vectors, and the index of the second dimension corresponds to the second group of vectors.

In an embodiment, a mapping relationship between the strongest coefficient indicator and the index of the first dimension and the index of the second dimension is determined according to the number of vectors in the second group of vectors.

In an embodiment, an adjustment value of the strongest coefficient indicator is a product of an adjustment value of the index of the first dimension and the number of vectors in the second group of vectors.

In an embodiment, an adjustment value of the strongest coefficient indicator is a product of an adjustment value of the index of the second dimension and twice the number of vectors in the first group of vectors.

In an embodiment, in response to the number of vectors in the second group of vectors being one, the mapping relationship between the strongest coefficient indicator and the index of the first dimension and the index of the second dimension is that the strongest coefficient indicator is the same as the index of the first dimension, and the index of the second dimension is 0.

In an embodiment, in response to the number of vectors in the second group of vectors being 2, the mapping relationship between the strongest coefficient indicator and the index of the first dimension and the index of the second dimension is that the strongest coefficient indicator is determined according to the index of the second dimension and a product of the index of the first dimension and the number of vectors in the second group of vectors.

In an embodiment, the value range of the index of the first dimension is between 0 and twice the number of vectors in the first group of vectors minus 1, and the values of the index of the second dimension include 0 and 1.

In an embodiment, in response to the number of vectors in the second group of vectors being 2, the mapping relationship between the strongest coefficient indicator and the index of the first dimension and the index of the second dimension is that the strongest coefficient indicator is determined according to the index of the first dimension and a product of the index of the second dimension and the number of vectors of the first group of vectors.

In an embodiment, the strongest coefficient indicator and the index of the second dimension have the same adjustment value.

In an embodiment, an adjustment value of the strongest coefficient indicator is a product of an adjustment value of the index of the second dimension and the number of vectors in the first group of vectors.

In an embodiment, the channel state information further includes a first number indicator. The first number indicator is used to indicate the number K of coefficients that need to be reported in the first coefficients, and is reported by a field formed by A bits, and K is the value of the first number indicator plus 1. The value of the first number indicator is the value of the field formed by the A bits, and A is a non-negative integer.

In an embodiment, the channel state information further includes a first number indicator. The first number indicator is used to indicate the number K of coefficients whose values are not 0 in the first coefficients, and is reported by a field formed by A bits, and K is the value of the first number indicator plus 1. The value of the first number indicator is the value of the field formed by the A bits, and A is a non-negative integer.

The information transmission apparatus provided in this embodiment is configured to perform the information transmission method applied to the first communication node in the embodiment shown in FIG. 1. The information transmission apparatus provided in this embodiment has similar implementation principles and technical effects, and details are not repeated here.

Figure 4:
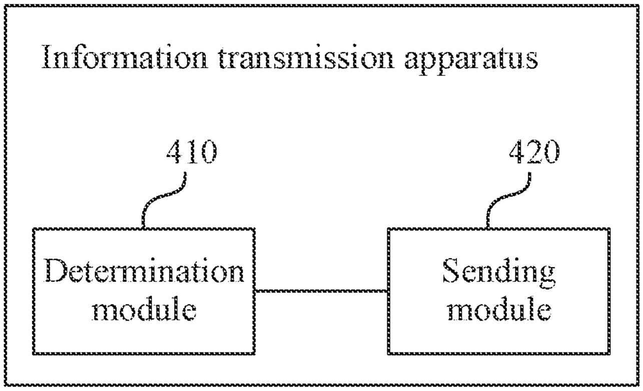
FIG. 4 is a block diagram illustrating the structure of another information transmission apparatus according to an embodiment of the present application.

In an embodiment, FIG. 4 is a block diagram illustrating the structure of another information transmission apparatus according to an embodiment of the present application. This embodiment is applied to a second communication node. As shown in FIG. 4, an information reporting apparatus in this embodiment includes a determination module 410 and a sending module 420.

The determination module 410 is configured to determine configuration information.

The sending module 420 is configured to send the configuration information to a first communication node to enable the first communication node to report channel state information according to the configuration information.

The channel state information includes a precoding matrix indicator, and the precoding matrix indicator includes a strongest coefficient indicator. A precoding matrix corresponding to the precoding matrix indicator is formed by combining first coefficients with a first group of vectors, or a precoding matrix corresponding to the precoding matrix indicator is formed by combining first coefficients with a group of vectors and a second group of vectors. The strongest coefficient indicator is used to indicate index of a strongest coefficient in the first coefficients.

In an embodiment, the index of the strongest coefficient include an index of a first dimension and an index of a second dimension.

The index of the first dimension corresponds to the first group of vectors, and the index of the second dimension corresponds to the second group of vectors.

In an embodiment, a mapping relationship between the strongest coefficient indicator and the index of the first dimension and the index of the second dimension is determined according to the number of vectors in the second group of vectors.

In an embodiment, an adjustment value of the strongest coefficient indicator is a product of an adjustment value of the index of the first dimension and the number of vectors in the second group of vectors.

In an embodiment, an adjustment value of the strongest coefficient indicator is a product of an adjustment value of the index of the second dimension and twice the number of vectors in the first group of vectors.

In an embodiment, in response to the number of vectors in the second group of vectors being one, the mapping relationship between the strongest coefficient indicator and the index of the first dimension and the index of the second dimension is that the strongest coefficient indicator is the same as the index of the first dimension, and the index of the second dimension is 0.

In an embodiment, in response to the number of vectors in the second group of vectors being 2, the mapping relationship between the strongest coefficient indicator and the index of the first dimension and the index of the second dimension is that the strongest coefficient indicator is determined according to the index of the second dimension and a product of the index of the first dimension and the number of vectors in the second group of vectors.

In an embodiment, the value range of the index of the first dimension is between 0 and twice the number of vectors in the first group of vectors minus 1, and the values of the index of the second dimension include 0 and 1.

In an embodiment, in response to the number of vectors in the second group of vectors being 2, the mapping relationship between the strongest coefficient indicator and the index of the first dimension and the index of the second dimension is that the strongest coefficient indicator is determined according to the index of the first dimension and a product of the index of the second dimension and the number of vectors in the first group of vectors.

In an embodiment, the strongest coefficient indicator and the index of the second dimension have the same adjustment value.

In an embodiment, an adjustment value of the strongest coefficient indicator is a product of an adjustment value of the index of the second dimension and the number of vectors in the first group of vectors.

In an embodiment, the channel state information further includes a first number indicator. The first number indicator is used to indicate the number K of coefficients that need to be reported in the first coefficients, and is reported by a field formed by A bits, and K is the value of the first number indicator plus 1. The value of the first number indicator is the value of the field formed by the A bits, and A is a non-negative integer.

In an embodiment, the channel state information further includes a first number indicator. The first number indicator is used to indicate the number K of coefficients whose values are not 0 in the first coefficients, and is reported by a field formed by A bits, and K is the value of the first number indicator plus 1. The value of the first number indicator is the value of the field formed by the A bits, and A is a non-negative integer.

The information transmission apparatus provided in this embodiment is configured to perform the information transmission method applied to the second communication node in the embodiment shown in FIG. 2. The information transmission apparatus provided in this embodiment has similar implementation principles and technical effects, and details are not repeated here.

Figure 5:
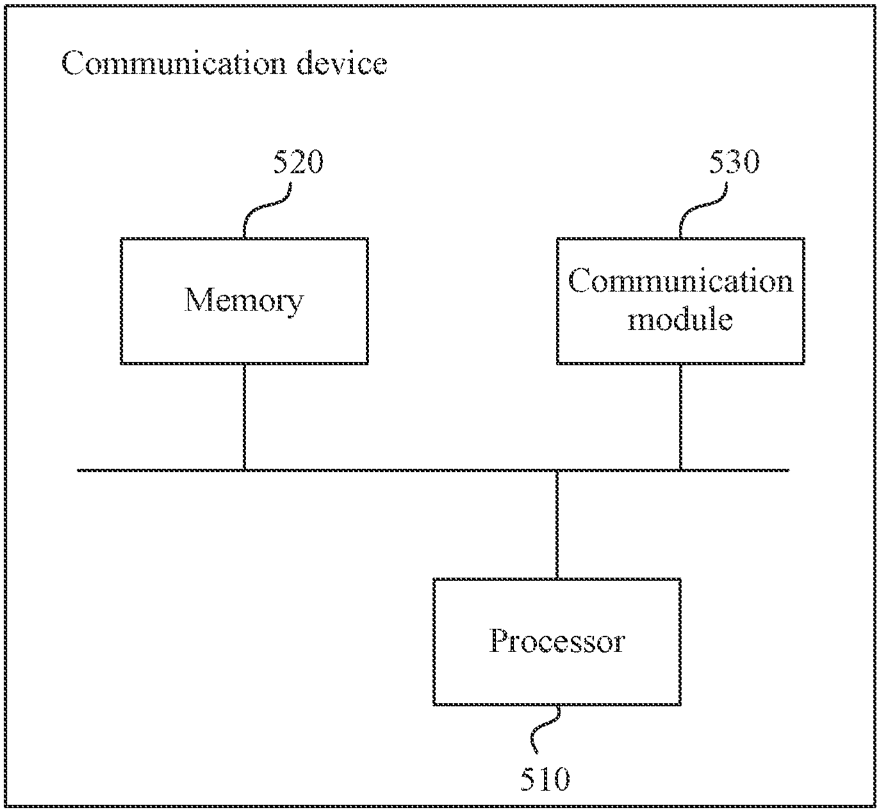
FIG. 5 is a diagram illustrating the structure of a communication device according to an embodiment of the present application.

FIG. 5 is a diagram illustrating the structure of a communication device according to an embodiment of the present application. As shown in FIG. 5, the communication device provided in the present application includes a processor 510, a memory 520 and a communication module 530. One or more processors 510 may be provided in the device, with one processor 510 as an example in FIG. 5. One or more memories 520 may be provided in the device, with one memory 520 as an example in FIG. 5. The processor 510, the memory 520 and the communication module 530 in the device may be connected by a bus or in other manners. The connection via the bus is shown as an example in FIG. 5. In this embodiment, the device may be a first communication node. For example, the first communication node may be a terminal side (such as a user equipment).

The memory 520, as a computer-readable storage medium, may be configured to store software programs and computer executable programs and modules such as program instructions/modules corresponding to the device in any embodiment of the present application (such as the receiving module 310 and the reporting module 320 in the information transmission apparatus). The memory 520 may include a program storage region and a data storage region, where the program storage region may store an operating system and an application program required by at least one function while the data storage region may store data created depending on the use of a device. Additionally, the memory 520 may include a high-speed random-access memory and may further include a non-volatile memory, such as at least one magnetic disk memory, flash memory or another non-volatile solid-state memory. In some examples, the memory 520 may further include memories located remotely relative to the processor 510, and these remote memories may be connected to the device via a network. Examples of the preceding network include, but are not limited to, the Internet, an intranet, a local area network, a mobile communication network and a combination thereof.

The communication module 530 is configured to perform communication interaction between the first communication node and a second communication node.

In the case where the communication device is the first communication node, the preceding device may be configured to perform the information transmission method applied to the first communication node provided in any preceding embodiment and has corresponding functions and effects.

In the case where the communication device is the second communication node, the preceding device may be configured to perform the information transmission method applied to the second communication node provided in any preceding embodiment and has corresponding functions and effects.

An embodiment of the present application further provides a storage medium including computer-executable instructions. When executed by a computer processor, the computer-executable instructions are configured to cause the computer processor to perform an information transmission method applied to a first communication node. The method includes: receiving configuration information of a second communication node and reporting channel state information to the second communication node according to the configuration information. The channel state information includes a precoding matrix indicator, and the precoding matrix indicator includes a strongest coefficient indicator. A precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors. The strongest coefficient indicator is used to indicate index of a strongest coefficient in the first coefficients.

An embodiment of the present application further provides a storage medium including computer-executable instructions. When executed by a computer processor, the computer-executable instructions are configured to cause the computer processor to perform an information transmission method applied to a second communication node. The method includes: determining configuration information and sending the configuration information to a first communication node to enable the first communication node to report channel state information according to the configuration information. The channel state information includes a precoding matrix indicator, and the precoding matrix indicator includes a strongest coefficient indicator. A precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors. The strongest coefficient indicator is used to indicate index of a strongest coefficient in the first coefficients.

It is to be understood by those skilled in the art that the term “user equipment” covers any suitable type of a wireless user equipment, such as a mobile phone, a portable data processing apparatus, a portable web browser, or a vehicle-mounted mobile station.

Generally, multiple embodiments of the present application may be implemented in hardware or dedicated circuits, software, logics or any combination thereof. For example, some aspects may be implemented in hardware while the other aspects may be implemented in firmware or software that may be executed by a controller, a microprocessor or another computing apparatus, though the present application is not limited thereto.

Embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for the local technical environment and may be implemented using any suitable data storage technology, such as, but not limited to, a read-only memory (ROM), a random-access memory (RAM) and an optical memory apparatus and system (a digital video disc (DVD), or a compact disc (CD)). A computer-readable medium may include a non-transitory storage medium. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. An information transmission method, applied to a first communication node, comprising:

receiving configuration information from a second communication node; and reporting channel state information to the second communication node according to the configuration information;

wherein the channel state information comprises a precoding matrix indicator, and the precoding matrix indicator comprises a strongest coefficient indicator;

wherein a precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors, and the strongest coefficient indicator is used to indicate an index of a strongest coefficient in the first coefficients, wherein the strongest coefficient refers to a coefficient having a maximum amplitude in the first coefficients; and wherein the channel state information further comprises a first number indicator, wherein the first number indicator is used to indicate a number K of coefficients whose values are not 0 in the first coefficients, and the first number indicator is reported by a field formed by A bits, and K denotes a value of the first number indicator plus 1, wherein the value of the first number indicator is a value of the field formed by the A bits, and A is a non-negative integer.

2. The method according to claim 1, wherein the index of the strongest coefficient comprises an index of a first dimension and an index of a second dimension; and wherein the index of the first dimension corresponds to the first group of vectors, and the index of the second dimension corresponds to the second group of vectors.

3. The method according to claim 2, wherein a mapping relationship between the strongest coefficient indicator and the index of the first dimension and the index of the second dimension is determined according to the number of vectors in the second group of vectors.

4. The method according to claim 3, wherein an adjustment value of the strongest coefficient indicator is a product of an adjustment value of the index of the first dimension and the number of vectors in the second group of vectors.

5. The method according to claim 3, wherein an adjustment value of the strongest coefficient indicator is a product of an adjustment value of the index of the second dimension and twice the number of vectors in the first group of vectors.

6. The method according to claim 3, wherein in response to the number of vectors in the second group of vectors being one, the mapping relationship between the strongest coefficient indicator and the index of the first dimension and the index of the second dimension comprises the strongest coefficient indicator being the same as the index of the first dimension, and the index of the second dimension being 0.

7. The method according to claim 3, wherein in response to the number of vectors in the second group of vectors being 2, the mapping relationship between the strongest coefficient indicator and the index of the first dimension and the index of the second dimension comprises the strongest coefficient indicator being determined according to the index of the second dimension and a product of the index of the first dimension and the number of vectors in the second group of vectors.

8. The method according to claim 7, wherein a value range of the index of the first dimension is between 0 and twice the number of vectors in the first group of vectors minus 1, and values of the index of the second dimension comprise 0 and 1.

9. The method according to claim 3, wherein in response to the number of vectors in the second group of vectors being 2, the mapping relationship between the strongest coefficient indicator and the index of the first dimension and the index of the second dimension comprises the strongest coefficient indicator being determined according to the index of the first dimension and a product of the index of the second dimension and the number of vectors in the first group of vectors.

10. The method according to claim 3, wherein the strongest coefficient indicator and the index of the second dimension have a same adjustment value.

11. The method according to claim 3, wherein an adjustment value of the strongest coefficient indicator is a product of an adjustment value of the index of the second dimension and the number of vectors in the first group of vectors.

12. An information transmission method, applied to a second communication node, comprising:

determining configuration information;

sending the configuration information to a first communication node to enable the first communication node to report channel state information according to the configuration information; and receiving the channel state information reported by the first communication node;

wherein the channel state information comprises a precoding matrix indicator, and the precoding matrix indicator comprises a strongest coefficient indicator;

wherein a precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors, and the strongest coefficient indicator is used to indicate index of a strongest coefficient in the first coefficients, wherein the strongest coefficient refers to a coefficient having a maximum amplitude in the first coefficients; and wherein the channel state information further comprises a first number indicator, wherein the first number indicator is used to indicate a number K of coefficients whose values are not 0 in the first coefficients, and the first number indicator is reported by a field formed by A bits, and K denotes a value of the first number indicator plus 1, wherein the value of the first number indicator is a value of the field formed by the A bits, and A is a non-negative integer.

13. A non-transitory storage medium storing a computer program which, when executed by a processor, causes the processor to perform an information transmission method, wherein the method comprises:

receiving configuration information from a second communication node; and reporting channel state information to the second communication node according to the configuration information;

wherein the channel state information comprises a precoding matrix indicator, and the precoding matrix indicator comprises a strongest coefficient indicator;

wherein a precoding matrix corresponding to the precoding matrix indicator is formed by combining first coefficients with a first group of vectors, or a precoding matrix corresponding to the precoding matrix indicator is formed by combining first coefficients with a first group of vectors and a second group of vectors, and the strongest coefficient indicator is used to indicate an index of a strongest coefficient in the first coefficients, wherein the strongest coefficient refers to a coefficient having a maximum amplitude in the first coefficients; and wherein the channel state information further comprises a first number indicator, wherein the first number indicator is used to indicate a number K of coefficients whose values are not 0 in the first coefficients, and the first number indicator is reported by a field formed by A bits, and K denotes a value of the first number indicator plus 1, wherein the value of the first number indicator is a value of the field formed by the A bits, and A is a non-negative integer.

14. The non-transitory storage medium according to claim 13, wherein the index of the strongest coefficient comprises an index of a first dimension and an index of a second dimension; and wherein the index of the first dimension corresponds to the first group of vectors, and the index of the second dimension corresponds to the second group of vectors.

15. The non-transitory storage medium according to claim 14, wherein a mapping relationship between the strongest coefficient indicator and the index of the first dimension and the index of the second dimension is determined according to the number of vectors in the second group of vectors.

16. The non-transitory storage medium according to claim 15, wherein an adjustment value of the strongest coefficient indicator is a product of an adjustment value of the index of the first dimension and the number of vectors in the second group of vectors.

17. The non-transitory storage medium according to claim 15, wherein an adjustment value of the strongest coefficient indicator is a product of an adjustment value of the index of the second dimension and twice the number of vectors in the first group of vectors.

18. The non-transitory storage medium according to claim 15, wherein in response to the number of vectors in the second group of vectors being one, the mapping relationship between the strongest coefficient indicator and the index of the first dimension and the index of the second dimension comprises the strongest coefficient indicator being the same as the index of the first dimension, and the index of the second dimension being 0.

* * * * *